(12) United States Patent
Sukharev et al.

(10) Patent No.: US 9,740,804 B2
(45) Date of Patent: Aug. 22, 2017

(54) CHIP-SCALE ELECTROTHERMAL ANALYSIS

(71) Applicant: Mentor Graphics Corporation, Wilsonville, OR (US)

(72) Inventors: Valeriy Sukharev, Campbell, CA (US); Armen Kteyan, Yerevan (AM); Junho Choy, Sunnyvale, CA (US); Henrik Hovsepyan, Yerevan (AM)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/931,637

(22) Filed: Nov. 3, 2015

(65) Prior Publication Data

US 2016/0125106 A1    May 5, 2016

Related U.S. Application Data

(60) Provisional application No. 62/074,284, filed on Nov. 3, 2014.

(51) Int. Cl.
*G06F 17/50* (2006.01)

(52) U.S. Cl.
CPC ...... *G06F 17/5009* (2013.01); *G06F 17/5068* (2013.01); *G06F 2217/80* (2013.01)

(58) Field of Classification Search
CPC .......... G06F 17/5009; G06F 17/5068; G06F 2217/80
See application file for complete search history.

(56) References Cited

U.S. PATENT DOCUMENTS

| 7,089,129 B2* | 8/2006 | Habitz | G06F 17/5036 |
| | | | 702/118 |
| 7,347,621 B2* | 3/2008 | Sri-Jayantha | G06F 1/206 |
| | | | 374/111 |

(Continued)

OTHER PUBLICATIONS

Ayala et al.; "Thermal modeling and analysis of 3D multi-processor chips", Integration VLSI J. (2010), doi:10.1016/j.vlsi.2010.06.002, pp. 1-15.*

(Continued)

*Primary Examiner* — Naum B Levin
(74) *Attorney, Agent, or Firm* — Klarquist Sparkman, LLP (57) ABSTRACT

Various aspects of the disclosed technology relate to techniques of determining an across-chip distribution of temperature generated by on-chip devices. Effective thermal conductance and effective thermal capacity for each region of a plurality of regions of a layout design are first extracted. The effective thermal conductance for a region in a metal layer is determined based at least on density information of metal interconnect lines within the region and has components associated with directions of the metal interconnect lines. A thermal circuit is then constructed based on the effective thermal conductance, the effective thermal capacity and heat information of thermal nodes. The heat information of thermal nodes is determined based on an electrical simulation on the integrated circuit associated with the layout design. A thermal simulation is then performed on the thermal circuit to determine temperature information of the thermal nodes.

12 Claims, 6 Drawing Sheets

Flow chart
400

(56) References Cited

U.S. PATENT DOCUMENTS

| | | | |
|---|---|---|---|
| 7,921,401 B2* | 4/2011 | Ito | G06F 17/5018 716/136 |
| 8,539,408 B1* | 9/2013 | Cheng | G06F 17/5036 716/110 |
| 8,543,361 B2* | 9/2013 | Chen | G06F 17/5036 703/2 |
| 8,626,475 B1* | 1/2014 | Fontes | G06F 17/5018 700/29 |
| 8,701,073 B1* | 4/2014 | Fu | G06F 17/50 716/106 |
| 8,924,909 B2* | 12/2014 | Clark | G06F 17/5081 382/154 |
| 9,135,391 B2* | 9/2015 | Gibson | G06F 17/5081 |
| 9,208,270 B2* | 12/2015 | Fontes | G06F 17/5018 |
| 9,323,870 B2* | 4/2016 | Chandra | G06F 17/50 |
| 2007/0244676 A1* | 10/2007 | Shang | G06F 17/5018 703/2 |
| 2013/0298101 A1* | 11/2013 | Chandra | G06F 17/50 716/136 |
| 2013/0339918 A1* | 12/2013 | Clark | G06F 17/5081 716/122 |
| 2014/0096102 A1* | 4/2014 | Fu | G06F 17/50 716/133 |
| 2016/0133843 A1* | 5/2016 | Rogers | C01B 31/026 257/9 |

OTHER PUBLICATIONS

Avram Bar-Cohen and Peng Wang, "On-chip Hot Spot Remediation with Miniaturized Thermoelectric Coolers", in Microgravity Sci. Technol (2009) 21 (Suppl 1):S351-S359, Received: Mar. 24, 2009, Accepted: Jul. 6, 2009, Published online: Jul. 24, 2009, © Springer Science + Business Media B.V. 2009.

B. Walter Rosen and Zvi Hashin, "Effective Thermal Expansion Coefficients and Specific Heats of Composite Materials", in Int. J. Engng. Sci. vol. 8, pp. 157-I 73. Pergamon Press 1970. Printed in Great Britain.

Seri Lee, Seaho Song, Van Au, and Kevin P. Moran, "Constriction/Spreading Resistance Model for Electronics Packaging", in ASME/JSME Thermal Engineering Conference: vol. 4, ASME 1995.

Wei Huang, Shougata Ghosh, Sive Velusamy, Karthik Sankaranarayanan, Kevin Skadron, and Mircea R. Stan, "HotSpot: A Compact Thermal Modeling Methodology for Early-Stage VLSI Design", in IEEE Transactions on Very Large Scale Integration (VLSI) Systems, Vol. 14, No. 5, May 2006.

Arvind Sridhar, Alessandro Vincenzi, Martino Ruggiero, Thomas Brunschwiler, and David Atienza, "3D-ICE: Fast Compact Transient Thermal Modeling for 3D ICs with Inter-tier Liquid Cooling", in IEEE Conference Publications, 2010, pp 463-470, DOI: 10.1109/ICCAD.2010.5653749.

\* cited by examiner

Flow chart 400

FIG. 6a $$G = \begin{bmatrix} (g_{01}+g_{12}) & -g_{12} & 0 & 0 & 0 \\ -g_{12} & (g_{12}+g_{23}) & -g_{23} & 0 & 0 \\ 0 & -g_{23} & (g_{23}+g_{34}) & -g_{34} & 0 \\ 0 & 0 & -g_{34} & (g_{34}+g_{45}) \end{bmatrix}$$

FIG. 6b

CHIP-SCALE ELECTROTHERMAL ANALYSIS

RELATED APPLICATIONS

This application claims the benefit of U.S. Provisional Patent Application No. 62/074,284, filed on Nov. 3, 2014, and naming Valeriy Sukharev et al. as inventors, which application is incorporated entirely herein by reference.

FIELD OF THE DISCLOSED TECHNOLOGY

The present disclosed technology relates to circuit design and fabrication. Various aspects of the disclosed technology may be particularly useful for simulating temperature distribution across chips.

BACKGROUND OF THE DISCLOSED TECHNOLOGY

Electronic circuits, such as integrated circuits (ICs), are used in a variety of products, from automobiles to microwaves to personal computers. Designing and fabricating IC devices typically involves many steps, sometimes referred to as the "design flow." The particular steps of a design flow often are dependent upon the type of the circuit, its complexity, the design team, and the circuit fabricator or foundry that will manufacture the circuit. Typically, software and hardware "tools" verify the design at various stages of the design flow by running software simulators and/or hardware emulators. These steps aid in the discovery of errors in the design, and allow the designers and engineers to correct or otherwise improve the design.

Several steps are common to most design flows. Initially, the specification for a new circuit is transformed into a logical design, such as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Typically, a designer will select groups of geometric elements representing IC components (e.g., contacts, channels, gates, etc.) and place them in a design area. These groups of geometric elements may be custom designed, selected from a library of previously-created designs, or some combination of both. Lines are then routed between the geometric elements, which will form the wiring used to interconnect the electronic devices. Layout tools (often referred to as "place and route" tools), such as Mentor Graphics' IC Station or Cadence's Virtuoso, are commonly used for both of these tasks.

Circuit layout descriptions can be provided in many different formats. The Graphic Data System II (GDSII) format is a popular format for transferring and archiving two-dimensional (2D) graphical circuit layout data. Among other features, it contains a hierarchy of structures, each structure containing layout elements (e.g., polygons, paths or poly-lines, circles and textboxes). Other formats include an open source format named Open Access, Milkyway by Synopsys, Inc., EDDM by Mentor Graphics, Inc., and the more recent Open Artwork System Interchange Standard (OASIS) proposed by Semiconductor Equipment and Materials International (SEMI). These various industry formats are used to define the geometrical information in design layouts that are employed to manufacture integrated circuits. Once the design is finalized, the layout portion of the design can be used by fabrication tools to manufacture the circuit using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a mask must be created to expose only the desired areas to the radiation, and to protect the other areas from exposure. The mask is created from circuit layout data. That is, the geometric elements described in a design layout define the relative locations or areas of the circuit that will be exposed to radiation through the mask. A mask or reticle writing tool is used to create the mask based upon the design layout, after which the mask can be used in a photolithographic process.

As designers and manufacturers continue to increase the number of circuit components in a given area and/or shrink the size of circuit components, the shapes reproduced on the substrate (and thus the shapes in the mask) become smaller and are placed closer together. The rise in transistor density and switching speed has led to a steep increase in chip heat flux and growing concern over the emergence of on-chip "hot spots". These specific regions on the chip can have a heat flux several times higher than the chip average, resulting in exceedingly high local temperatures and degrading device performance and reliability significantly. To fully account for the thermal effects, it is important to predict across-die temperature distribution in an accurate but still efficient way.

BRIEF SUMMARY OF THE DISCLOSED TECHNOLOGY

Various aspects of the disclosed technology relate to techniques of determining an across-chip distribution of temperature generated by on-chip devices. In one aspect, there is a method comprising: extracting effective thermal conductance and effective thermal capacity for each region of a plurality of regions of a layout design, the layout design corresponding to at least a portion of an integrated circuit, and the effective thermal conductance for a region in a metal layer being determined based at least on density information of metal interconnect lines within the region and having components associated with directions of the metal interconnect lines; constructing a thermal circuit based on the effective thermal conductance, the effective thermal capacity and heat information of thermal nodes, the heat information of thermal nodes determined based on an electrical simulation on the integrated circuit; and performing a thermal simulation on the thermal circuit to determine temperature information of the thermal nodes.

The extracting may be further based on density information of vias on via layer(s) within the each region. The effective thermal capacity may be determined based on mechanical property information, wherein the mechanical property information comprises Young's modulus, Poisson factors, thermal extension coefficients, or any combination thereof.

According to various embodiments of the disclosed technology, the method may further comprise: performing another electrical simulation on the integrated circuit based on the temperature information to determine new heat information; and performing another thermal simulation on the thermal circuit modified based on the new heat information to determine new temperature information. The method may still further comprise repeating the performing another electrical simulation by replacing the temperature information with the new temperature information and the performing another thermal simulation until one of the one or more predetermined conditions is met.

In another aspect, there are one or more computer-readable media storing computer-executable instructions for causing one or more processors to perform the above method.

In still another method, there is a system, comprising: one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

FIG. 6b illustrates an example of a matrix of heat capacitance for the one-dimensional regions in FIG. 6a.

DETAILED DESCRIPTION OF THE DISCLOSED TECHNOLOGY

Various aspects of the present disclosed technology relate to determining an across-chip distribution of temperature generated by on-chip devices. In the following description, numerous details are set forth for the purpose of explanation. However, one of ordinary skill in the art will realize that the disclosed technology may be practiced without the use of these specific details. In other instances, well-known features have not been described in details to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "extract", "construct" and "perform" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Operating Environment

The execution of various electronic design automation processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design automation processes and the large size of many circuit designs, various electronic design automation tools are configured to operate on a computing system capable of concurrently running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed technology.

Figure 1:
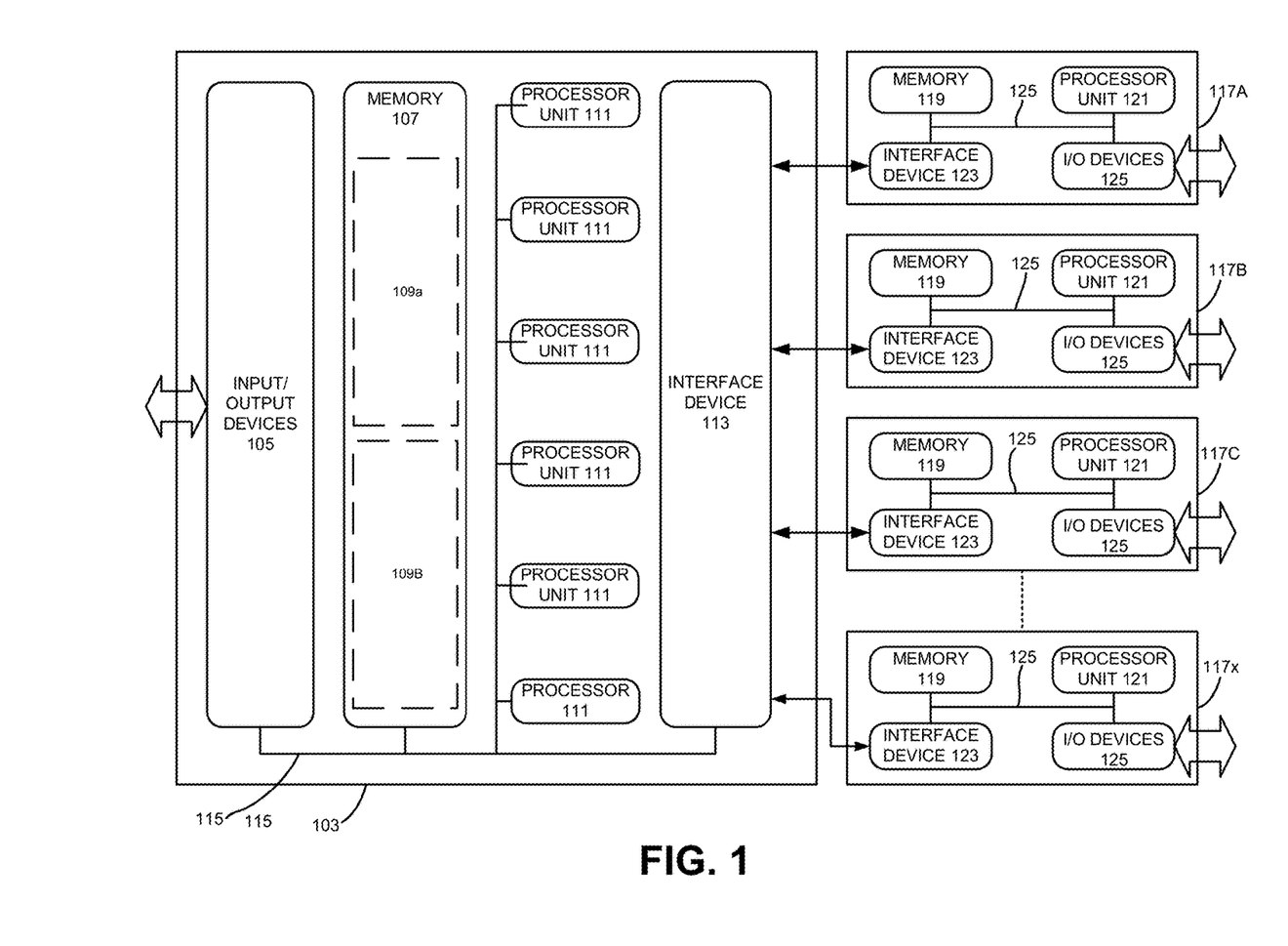
FIG. 1 illustrates an example of a computing system that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
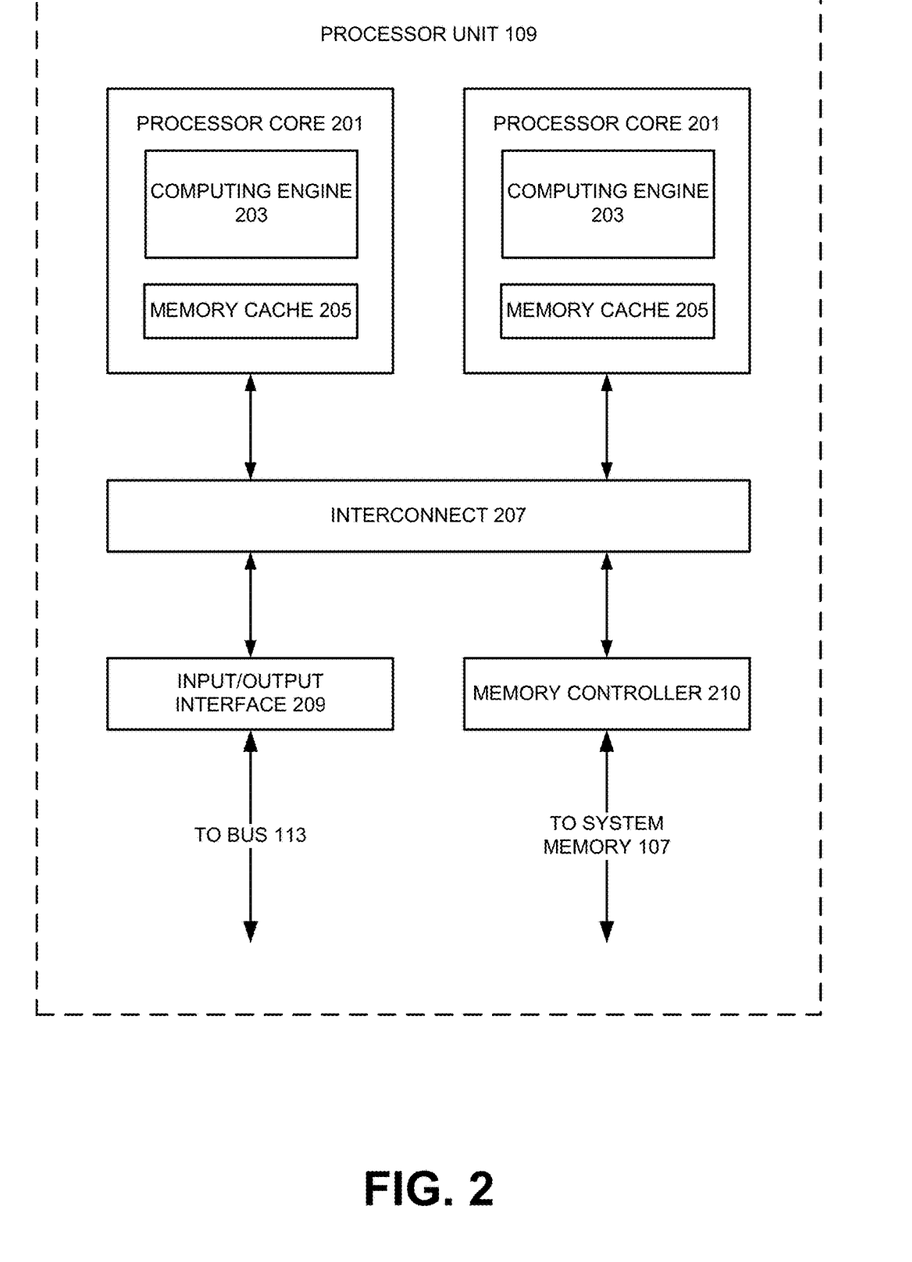
FIG. 2 illustrates an example of a multi-core processor unit that may be used to implement various embodiments of the invention.

With some implementations of the disclosed technology, the master computing device 103 may employ one or more processing units 111 having more than one processor core. Accordingly, FIG. 2 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory accessible shared by the processor cores 201.

While FIG. 2 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed technology.

Electrothermal Analysis Tool

Figure 3:
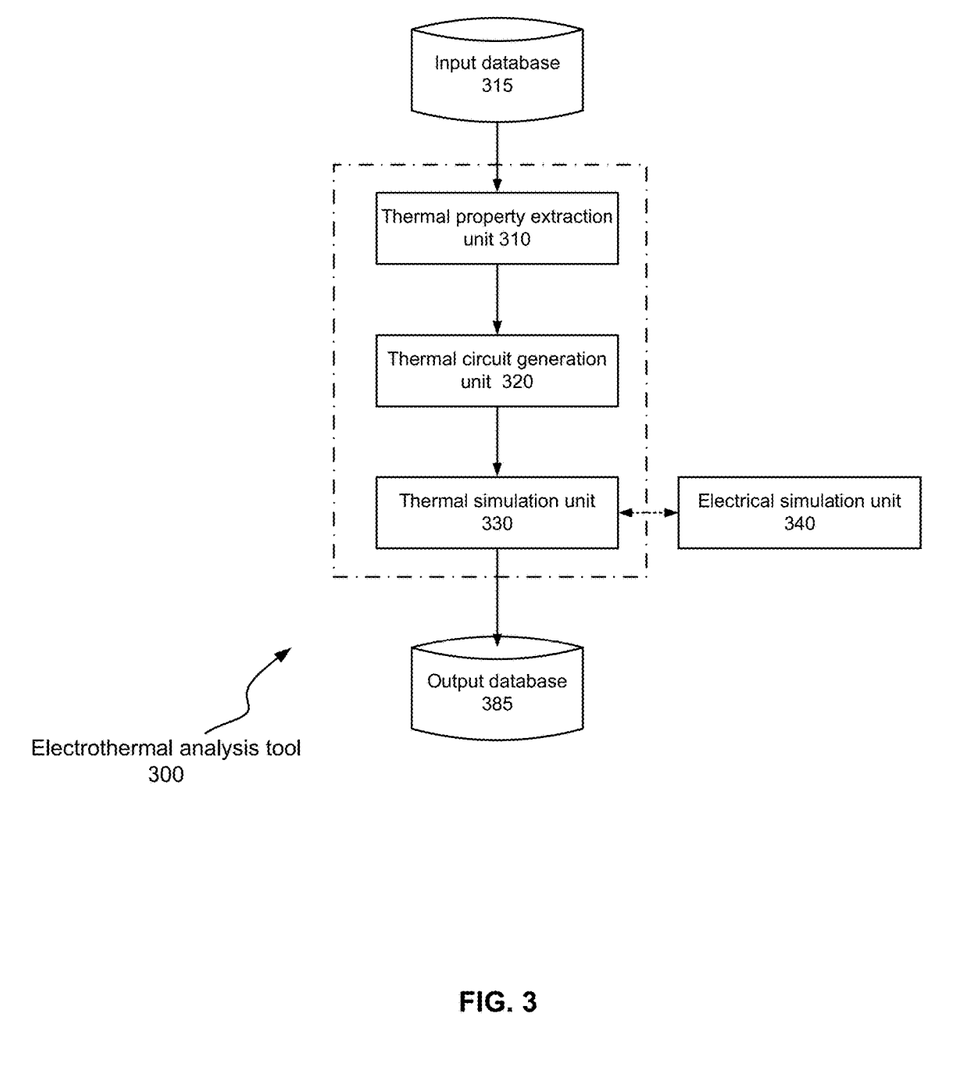
FIG. 3 illustrates an example of an electrothermal analysis tool that may be implemented according to various embodiments of the disclosed technology.

FIG. 3 illustrates an example of an electrothermal analysis tool 300 that may be implemented according to various embodiments of the disclosed technology. As seen in the figure, the electrothermal analysis tool 300 includes a thermal property extraction unit 310, a thermal circuit generation unit 320, and a thermal simulation unit 330. As also shown in this figure, various implementations of the electrothermal analysis tool 300 may cooperate with (or incorporate, in whole or part) an electrical simulation unit 340, an input database 315 and an output database 385.

As will be discussed in more detail below, the thermal property extraction unit 310 extracts effective thermal conductance and effective thermal capacity for each region of a plurality of regions of a layout design. The thermal circuit generation unit 320 constructs a thermal circuit based on the effective thermal conductance, the effective thermal capacity and heat information of thermal nodes. The thermal simulation unit 330 performs a thermal simulation on the thermal circuit to determine temperature information of the thermal nodes. With various implementations of the disclosed technology, the electrical simulation unit 340 performing an electrical simulation on the integrated circuit based on the temperature information to determine new heat information of thermal nodes. Then the thermal simulation unit 330 may perform another thermal simulation on the thermal circuit modified based on the new heat information of thermal nodes to determine new temperature information. The electrical simulation and the thermal simulation may perform alternatively until one of one or more predetermined termination conditions is met.

As previously noted, various embodiments of the disclosed technology may be embodied by a computing system, such as the computing system illustrated in FIG. 1 and FIG. 2. Accordingly, one or more of the thermal property extraction unit 310, the thermal circuit generation unit 320, the thermal simulation unit 330 and the electrical simulation unit 340 are implemented by one or more computing systems, such as the computing system illustrated in FIGS. 1 and 2, executing programmable instructions. Correspondingly, some other embodiments of the disclosed technology may be implemented by software-executable instructions, stored on a non-transitory computer-readable medium, for instructing a computing system to perform functions of one or more of the thermal property extraction unit 310, the thermal circuit generation unit 320, the thermal simulation unit 330 and the electrical simulation unit 340. Further, each unit may either be fully automated or allow a user to provide instructions for an operation. As used herein, the term "non-transitory computer-readable medium" refers to computer-readable medium that are capable of storing data for future retrieval, and not for propagating electro-magnetic waves. The non-transitory computer-readable medium may be, for example, a magnetic storage device, an optical storage device, a "punched" surface type device, or a solid state storage device.

It should be appreciated that, while the thermal property extraction unit 310, the thermal circuit generation unit 320, the thermal simulation unit 330 and the electrical simulation unit 340 are shown as separate units in FIG. 3, a single servant computer (or a single processor within a master computer) may be used to implement two or more of these units at different times, or components of two or more of these units at different times.

With various examples of the disclosed technology, the input database 315 and the output database 385 may be implemented using any suitable computer readable storage device. That is, either of the input database 315 and the output database 385 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. While the input database 315 and the output database 385 are shown as separate units in FIG. 3, a single data storage device may be used to implement some or all of these databases.

Determination of Across-Die Temperature Distribution

Figure 4:
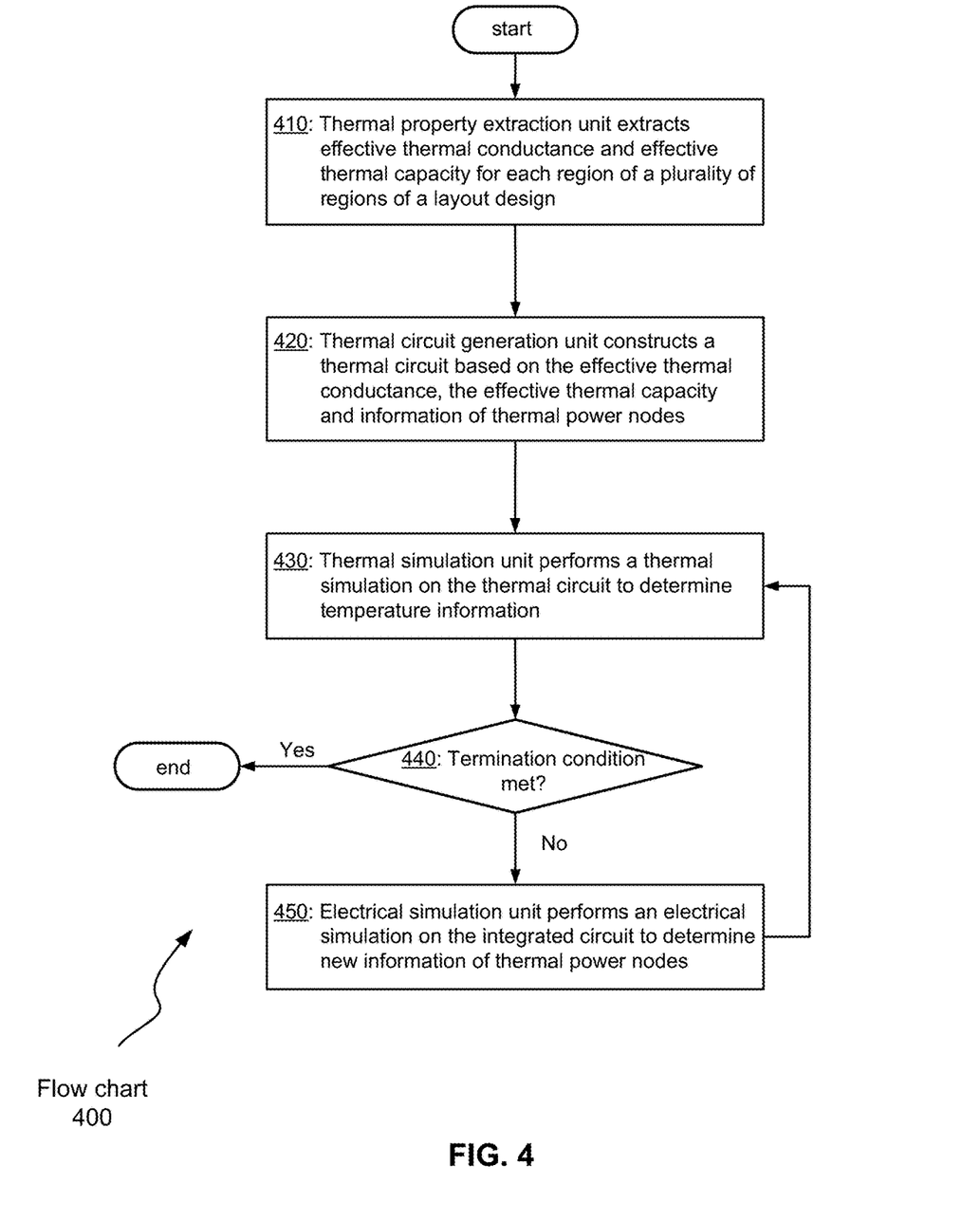
FIG. 4 illustrates a flowchart describing methods of electrothermal analysis according to various embodiments of the disclosed technology.

FIG. 4 illustrates a flowchart describing methods of electrothermal analysis according to various embodiments of the disclosed technology. For purposes of explanation, various methods encompassed in FIG. 4 will be described with reference to the electrothermal analysis tool 300 discussed earlier. It should be appreciated that the operations illustrated in FIG. 4 may be employed by implementations of a different electrothermal analysis tool, according to various embodiments of the disclosed technology. Likewise, it should be appreciated that the electrothermal analysis tool 300 shown in FIG. 3 or in other configurations may be used to perform methods according to various embodiments of the disclosed technology different from those encompassed by the flowchart of FIG. 4.

Also, it should be appreciated that various embodiments of the disclosed technology may be implemented by a system comprising one or more processors programmed to perform the operations described in FIG. 4. Still further, various embodiments of the disclosed technology may be implemented by processor-executable instructions, stored in a processor-readable medium, for causing one or more processors to perform the operations described in FIG. 4.

Figure 5:
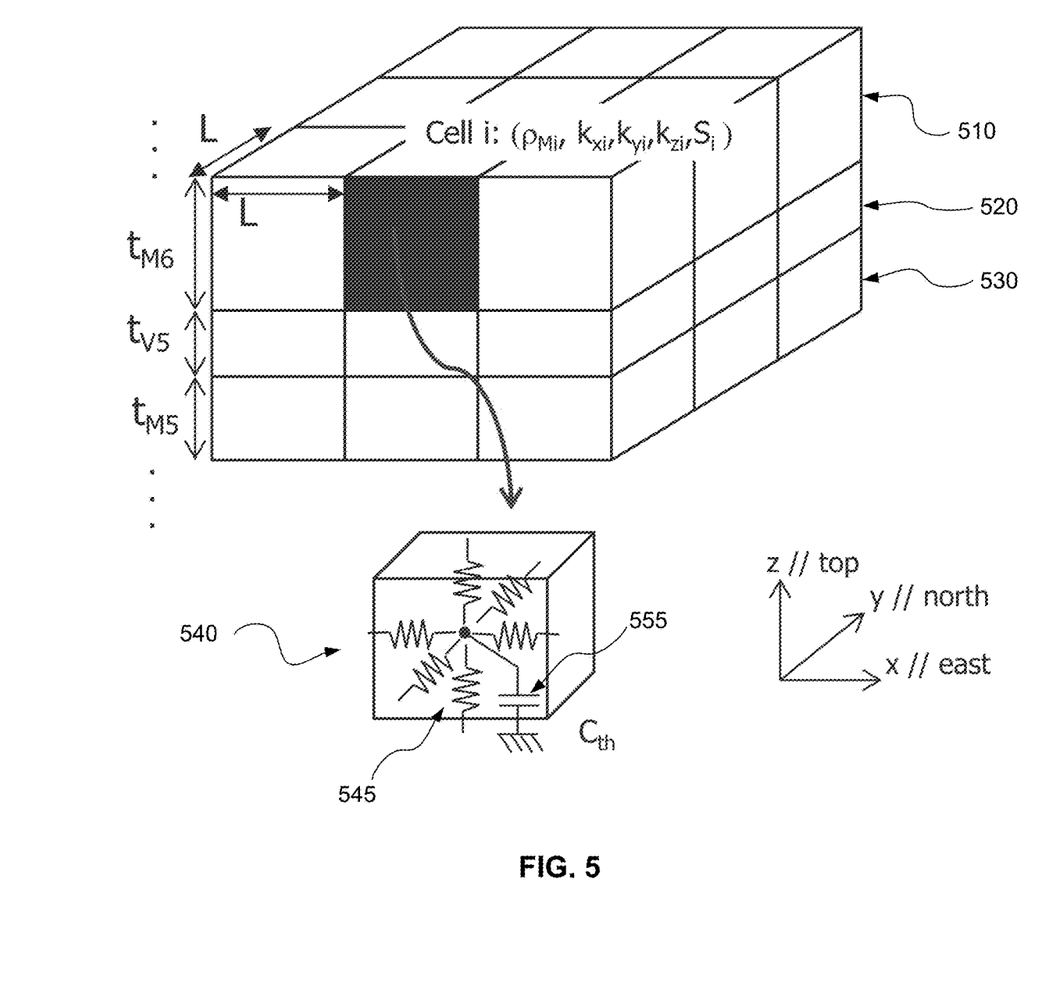
FIG. 5 illustrates an example of a die being divided into a plurality of regions according to various embodiments of the disclosed technology.

In operation 410 of the flowchart 400, the thermal property extraction unit 310 extracts effective thermal conductance and effective thermal capacity for each region of a plurality of regions of a layout design. The layout design corresponds to at least a portion of an integrated circuit. To account for non-uniform and anisotropy of metal segment distributions inside a die, the layout design is divided into a plurality of regions. FIG. 5 illustrates an example of a die being divided into a plurality of regions. Three metal layers of a portion of the die are shown in the figure: a metal layer 510 (M6), a dielectric layer 520 with vias (V5) and another metal layer 530 (M5). Each region is confined within one of the layers.

Also shown in the figure is an enlarged diagram of a region 540 from the metal layer 510. The thermal property of the enlarged region can be represented by a thermal circuit as shown in the figure. The circuit comprises effective thermal resistance (six thermal resistors 545) and effective thermal capacitance (one thermal capacitor 555). The effective thermal conductance is determined based at least on density information of metal interconnect lines and has components associated with directions of the metal interconnect lines. The following is an example of a set of equations for calculating the effective thermal resistance:

$$R_{top/bottom,i} = \frac{1}{k_{z,i}} \frac{t_{M6}/2}{L^2}; R_{north/south,i} = \frac{1}{k_{y,i}} \frac{L/2}{t_{M6}L};$$

$$R_{east/west,i} = \frac{1}{k_{x,i}} \frac{L/2}{t_{M6}L}$$

(1)

where L and t are dimension values as shown in the figure and k is the thermal conductivity determined based on the density of metal in the region and the direction of the interconnect lines. For k component parallel to the routing direction, the following equation may be used:

$$k_{//} = \rho_M k_M + (1-\rho_M) k_{ILD}$$

(2)

For k component normal to the routing direction, the following equation may be used:

$$k_\perp = k_{ILD}\left[1 + \frac{\rho_M}{k_{ILD}/(k_M - k_{ILD}) + (1-\rho_M)/2}\right]$$

(3)

For the vertical component of k, the following equation may be used:

$$k_Z = \rho_M k_M + (1-\rho_M) k_{ILD}$$

(4)

The effective thermal capacitance may be determined by the following equation:

$$C_{cell,i} = C_i (L \cdot L \cdot t_{M6})$$

(5)

where $C_i$ is the effective specific heat. The effective specific heat may be determined using the following equations. For the macroscopically isotropic case, when metal inclusion phase (metal lines and vias) is uniformly distributed in ILD (interlayer dielectric), the equation is:

$$C = \overline{C} + 9\Delta T_0 \left(\frac{\alpha_M - \alpha_{ILD}}{1/B_M - 1/B_{ILD}}\right)^2 \left[\frac{1}{B_{eff}} - \left(\frac{\rho_M}{B_M} + \frac{1-\rho_M}{B_{ILD}}\right)\right]$$

(6)

where the effective bulk modulus $B_{eff}$ is $$B_{eff} = \frac{E_M \rho_M + E_{ILD}(1-\rho_M)}{3(1 - 2(v_M \rho_M + v_{ILD}(1-\rho_M)))}$$

(6a)

Here, E and v are the Young's modulus and Poisson factors of the metal and ILD. In this disclosure, ρm is the metal (via) volume density.

For the transversely isotropic case (parallel metal lines), the equation is:

$$C = \overline{C} + 3\Delta T_0 \left[ (\rho_M B_M \alpha_M^2 + (1-\rho_M) B_{ILD} \alpha_{ILD}^2) - \frac{(\alpha_{11} - \rho_M \alpha_M - (1-\rho_M)\alpha_{ILD})^2}{\left(\frac{1}{E_{11}} - \frac{\rho_M}{E_M} - \frac{1-\rho_M}{E_{ILD}}\right)} \right] \quad (7)$$

where α, E and B are the CTE (coefficients for thermal expansion), Young's and bulk modulus of the metal and ILD; $\overline{C}$ is the volume averaged heat capacity; $\alpha_{11}$ and $E_{11}$ are the uniaxial effective CTE and modulus (in the line direction), and $\Delta T_0$ is the temperature gap between the anneal and use temperatures. $\alpha_{11}$ and $E_{11}$ are determined by:

$$E_{11} = E_M \rho_M + E_{ILD}(1-\rho_M) \quad (7a)$$

$$\alpha_{11} = \alpha + \frac{\alpha_M - \alpha_{ILD}}{1/B_M - 1/B_{ILD}} \left[ \frac{3(1 - 2(\nu_M \rho_M + \nu_{ILD}(1-\rho_M)))}{E_{11}} - \left(\frac{\rho_M}{B_M} + \frac{1-\rho_M}{B_{ILD}}\right) \right] \quad (7b)$$

Next, in operation 420, the thermal circuit generation unit 320 constructs a thermal circuit based on the effective thermal conductance, the effective thermal capacity and heat information of thermal nodes. The thermal nodes are fictive pins of the integrated circuit, which couple the integrated circuit to the thermal circuit. The heat power dissipated acts as heat "current source" at the thermal nodes for the thermal circuit. The heat information of thermal nodes is determined based on an electrical simulation on the integrated circuit. Various simulation tools such as SPICE and Fast-SPICE may be employed for the simulation.

Figure 6A:
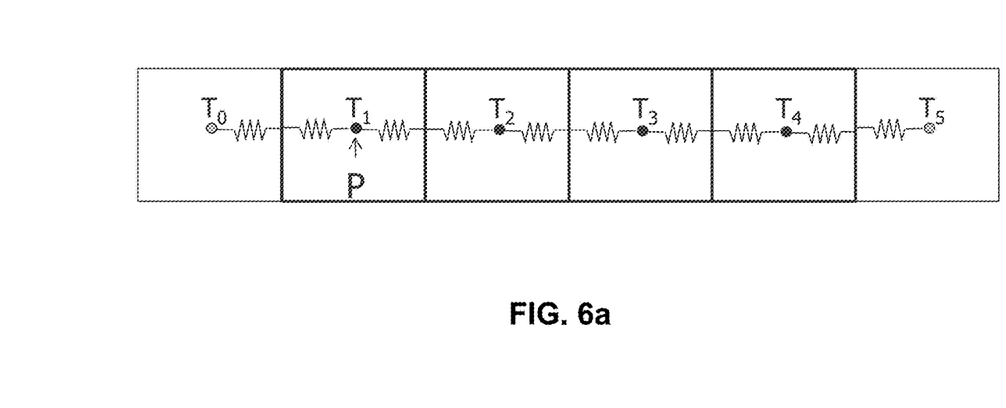
FIG. 6a illustrates an example of one-dimensional regions (cells)
Figure 6B:
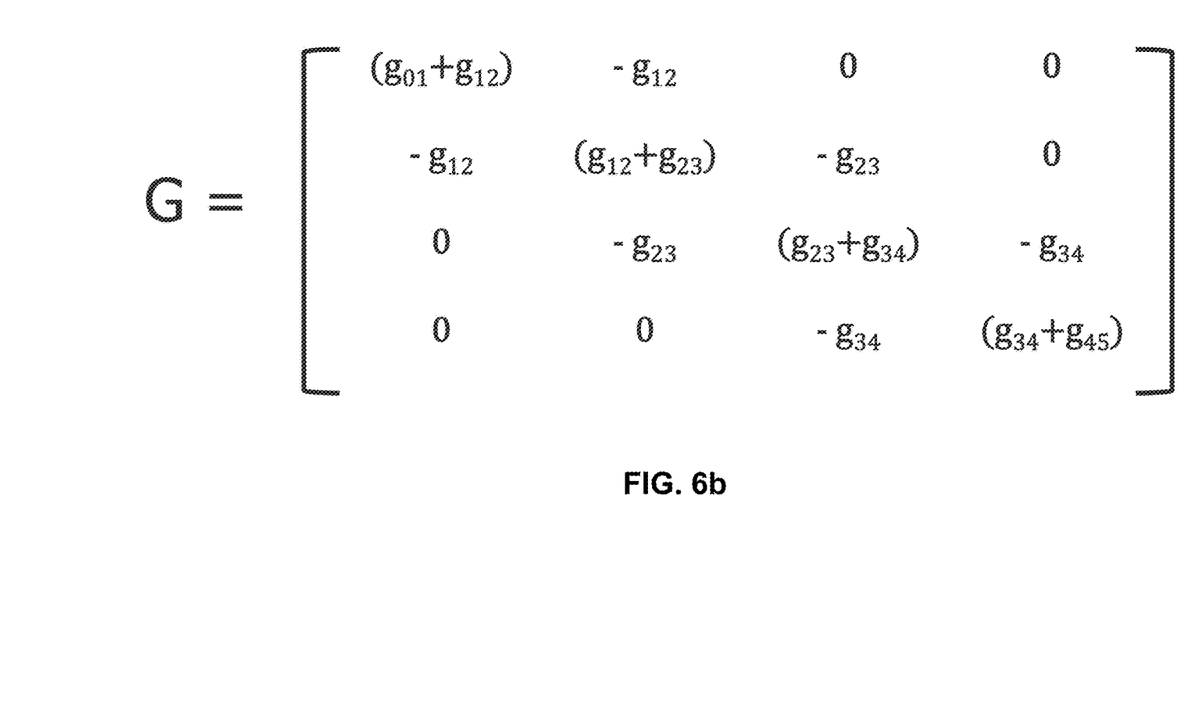

Next, in operation 430, the thermal simulation unit 330 performs a thermal simulation on the thermal circuit to determine temperature information of the thermal nodes. The thermal behavior of a circuit may be approximated by:

$$GT(t) + C\dot{T}(t) = U(t) \quad (8)$$

where G is a matrix of heat conductance values, C is a matrix of heat capacitance values, U is a vector of heat current sources and T is a vector of temperature values for the regions. C is a diagonal matrix as there is no coupling among the regions. G is a sparse matrix as non-zero non-diagonal terms represent the connections between neighboring regions. FIG. 6a illustrates an example of one-dimensional regions, and FIG. 6b illustrates a corresponding conductance matrix C. Here, C is a tridiagonal matrix and $g_{ij}$ represents thermal conductance between regions. Various conventional mathematical methods may be employed by the thermal simulation unit 330 to solve Eq. (8) under certain boundary conditions. The solution gives a temperature distribution of the thermal nodes.

In operation 440, the electrothermal analysis tool 300 compares the derived temperature distribution with the initial temperature distribution, the one used by the electrical simulation to derive the heat information for the thermal nodes. If they are close according to a predetermined threshold value, for example, the derived temperature distribution can be treated as the final temperature distribution and hot spots may be identified.

If they are not close, in operation 450, the electrical simulator unit 340 performs another electrical simulation on the integrated circuit based on the new temperature information to determine new heat information. Then the operation 330 is repeated based on the new heat information. This process may be iterated until newly derived temperature distribution does not change much from the previous one. Other termination condition may be considered as well. The maximum number of iterations may be another example.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the invention may be implemented using any desired combination of electronic design automation processes.

What is claimed is:

1. One or more non-transitory computer-readable media storing computer-executable instructions for causing one or more processors to perform a method, the method comprising:
    extracting effective thermal conductance and effective thermal capacity for each region of a plurality of regions of a layout design, the layout design corresponding to at least a portion of an integrated circuit, and the effective thermal conductance for a region in a metal layer being determined based at least on density information of metal interconnect lines within the region and having components dependent on directions of the metal interconnect lines;
    constructing a thermal circuit based on the effective thermal conductance, the effective thermal capacity, and heat information of thermal nodes, the heat information of thermal nodes determined based on an electrical simulation on the integrated circuit; and
    performing a thermal simulation on the thermal circuit to determine temperature information of the thermal nodes;
    wherein the effective thermal capacity is determined based on mechanical property information, the mechanical property information comprising Young's modulus, Poisson factors, thermal expansion coefficients, or any combination thereof.

2. The one or more non-transitory computer-readable media recited in claim 1, wherein the extracting is further based on density information of vias on via layer(s) within the each region.

3. The one or more non-transitory computer-readable media recited in claim 1, wherein the method further comprises:
    performing another electrical simulation on the integrated circuit based on the temperature information to determine new heat information; and
    performing another thermal simulation on the thermal circuit modified based on the new heat information to determine new temperature information.

4. The one or more non-transitory computer-readable media recited in claim 3, wherein the method further comprises:
    repeating the performing another electrical simulation by replacing the temperature information with the new temperature information and the performing another thermal simulation until one of one or more predetermined conditions is met.

5. A method, comprising:
extracting, using a computer, effective thermal conductance and effective thermal capacity for each region of a plurality of regions of a layout design, the layout design corresponding to at least a portion of an integrated circuit, and the effective thermal conductance for a region in a metal layer being determined based at least on density information of metal interconnect lines within the region and having components dependent on directions of the metal interconnect lines;
constructing, using the computer, a thermal circuit based on the effective thermal conductance, the effective thermal capacity, and heat information of thermal nodes, the heat information of thermal nodes determined based on an electrical simulation on the integrated circuit; and
performing, using the computer, a thermal simulation on the thermal circuit to determine temperature information of the thermal nodes;
wherein the effective thermal capacity is determined based on mechanical property information, the mechanical property information comprising Young's modulus, Poisson factors, thermal expansion coefficients, or any combination thereof.

6. The method recited in claim 5, wherein the extracting is further based on density information of vias on via layer(s) within the each region.

7. The method recited in claim 5, further comprising:
performing another electrical simulation on the integrated circuit based on the temperature information to determine new heat information; and
performing another thermal simulation on the thermal circuit modified based on the new heat information to determine new temperature information.

8. The method recited in claim 7, further comprising:
repeating the performing another electrical simulation by replacing the temperature information with the new temperature information and the performing another thermal simulation until one of one or more predetermined conditions is met.

9. A system comprising:
one or more processors, the one or more processors programmed to perform a method, the method comprising:
extracting effective thermal conductance and effective thermal capacity for each region of a plurality of regions of a layout design, the layout design corresponding to at least a portion of an integrated circuit, and the effective thermal conductance for a region in a metal layer being determined based at least on density information of metal interconnect lines within the region and having components dependent on directions of the metal interconnect lines;
constructing a thermal circuit based on the effective thermal conductance, the effective thermal capacity, and heat information of thermal nodes, the heat information of thermal nodes determined based on an electrical simulation on the integrated circuit; and
performing a thermal simulation on the thermal circuit to determine temperature information of the thermal nodes;
wherein the effective thermal capacity is determined based on mechanical property information, the mechanical property information comprising Young's modulus, Poisson factors, thermal expansion coefficients, or any combination thereof.

10. The system recited in claim 9, wherein the extracting is further based on density information of vias on via layer(s) within the each region.

11. The system recited in claim 9, wherein the method further comprises:
performing another electrical simulation on the integrated circuit based on the temperature information to determine new heat information; and
performing another thermal simulation on the thermal circuit modified based on the new heat information to determine new temperature information.

12. The system recited in claim 11, wherein the method further comprises:
repeating the performing another electrical simulation by replacing the temperature information with the new temperature information and the performing another thermal simulation until one of one or more predetermined conditions is met.

* * * * *